United States Patent
Bouskila et al.

(10) Patent No.: US 11,523,269 B2
(45) Date of Patent: Dec. 6, 2022

(54) MULTIPLE PROFILE REMOTE SUBSCRIBER IDENTITY MODULE

(71) Applicant: Flo Live Israel LTD., Bnei Brak (IL)

(72) Inventors: Oren Bouskila, Yad Nathan (IL); Eran Dotan Rosenberg, Herzelia (IL)

(73) Assignee: Flo Live Israel Ltd., Bnei Brak (IL)

( * ) Notice: Subject to any disclaimer, the term of this patent is extended or adjusted under 35 U.S.C. 154(b) by 0 days.

(21) Appl. No.: 16/927,341

(22) Filed: Jul. 13, 2020

(65) Prior Publication Data

US 2021/0044960 A1   Feb. 11, 2021

Related U.S. Application Data

(60) Provisional application No. 62/882,753, filed on Aug. 5, 2019.

(51) Int. Cl.
*H04W 8/18* (2009.01)
*H04W 76/10* (2018.01)
*H04W 88/06* (2009.01)

(52) U.S. Cl.
CPC ........... *H04W 8/183* (2013.01); *H04W 76/10* (2018.02); *H04W 88/06* (2013.01)

(58) Field of Classification Search
CPC ....... H04W 8/18; H04W 8/183; H04W 12/06; H04W 4/70; H04W 48/18; H04W 12/04; H04W 12/35; H04W 4/50; H04W 8/265; H04W 76/10; H04W 88/06; H04L 61/6054; H04L 67/303
See application file for complete search history.

(56) References Cited

U.S. PATENT DOCUMENTS

| | | | |
|---|---|---|---|
| 8,948,737 B2 | 2/2015 | Huang | |
| 10,735,944 B2 * | 8/2020 | Syed | H04W 8/186 |
| 10,911,937 B2 * | 2/2021 | Anslot | H04W 8/26 |
| 2008/0186903 A1 * | 8/2008 | Hedberg | H04W 8/26 370/319 |
| 2011/0077051 A1 | 3/2011 | Brown et al. | |
| 2011/0306318 A1 | 12/2011 | Rodgers et al. | |

(Continued)

FOREIGN PATENT DOCUMENTS

| | | | | |
|---|---|---|---|---|
| CN | 101123642 A | * | 2/2008 | |
| CN | 101622895 A | * | 1/2010 | H04L 61/1511 |

(Continued)

OTHER PUBLICATIONS

International Search Report and Written Opinion of International Searching Authority for PCT/IB2020/056581, ISA/RU, Moscow, Russia, dated Sep. 14, 2020.

*Primary Examiner* — Matthew C Sams
(74) *Attorney, Agent, or Firm* — M&B IP Analyst, LLC

(57) ABSTRACT

A method for initializing an electronic subscriber identity module (SIM) is provided. The method includes selecting a first bootstrap profile out of a plurality of bootstrap profiles configured with a device, wherein the first bootstrap profile is set with a first range of international mobile subscriber identifiers (IMSIs); activating the first bootstrap profile; attempting to connect to a first cellular network through an IMSI in the range of IMSIs; and establishing a connection with a central server when the device is connected to the first cellular network. The method may be operated by any device configured to connected to a cellular network.

17 Claims, 5 Drawing Sheets

(56) References Cited

U.S. PATENT DOCUMENTS

| | | |
|---|---|---|
| 2013/0072257 A1 | 3/2013 | Evans et al. |
| 2013/0281085 A1 | 10/2013 | Sen et al. |
| 2013/0288657 A1 | 10/2013 | Huang |
| 2013/0303122 A1 | 11/2013 | Li et al. |
| 2014/0051423 A1 | 2/2014 | Marsden et al. |
| 2015/0304836 A1* | 10/2015 | Anslot ............... H04W 12/06 455/411 |
| 2016/0134761 A1* | 5/2016 | Campbell ............ H04W 48/18 370/259 |
| 2016/0174069 A1* | 6/2016 | Bruner ............... H04L 63/065 455/411 |
| 2016/0246611 A1 | 8/2016 | Li et al. |
| 2016/0295544 A1 | 10/2016 | Jiang et al. |
| 2017/0196026 A1* | 7/2017 | Daoud ............... H04W 4/021 |
| 2017/0289788 A1* | 10/2017 | Lalwaney ........... H04L 41/0803 |
| 2018/0199303 A1 | 7/2018 | Vayilapelli et al. |
| 2018/0279124 A1 | 9/2018 | Mavrakis et al. |
| 2018/0376325 A1* | 12/2018 | Xu ..................... H04M 15/58 |
| 2019/0028884 A1* | 1/2019 | Namiranian .......... H04W 4/24 |
| 2020/0021973 A1* | 1/2020 | Anslot ................ H04W 12/04 |
| 2020/0177678 A1 | 6/2020 | Livanos et al. |
| 2020/0351653 A1* | 11/2020 | Khan ................. H04W 12/35 |
| 2021/0112413 A1* | 4/2021 | Pazhyannur ......... H04W 12/08 |

FOREIGN PATENT DOCUMENTS

| | | | | |
|---|---|---|---|---|
| CN | 102300193 A | | 12/2011 | |
| FR | 3042088 A1 | | 4/2017 | |
| GB | 2590592 A | * | 7/2021 | ............ H04W 12/06 |
| WO | 9857515 A1 | | 12/1998 | |
| WO | WO-2012160201 A1 | * | 11/2012 | ............ H04W 48/16 |
| WO | 2014151711 A1 | | 9/2014 | |
| WO | WO-2015185517 A1 | * | 12/2015 | ............ H04W 8/183 |
| WO | WO-2019057986 A1 | * | 3/2019 | ........ H04L 61/6054 |
| WO | 2021063973 A1 | | 4/2021 | |

* cited by examiner

MULTIPLE PROFILE REMOTE SUBSCRIBER IDENTITY MODULE

CROSS-REFERENCE TO RELATED APPLICATIONS

This application claims the benefit of U.S. Provisional Application No. 62/882,753 filed on Aug. 5, 2019, the contents of which are hereby incorporated by reference.

TECHNICAL FIELD

The present disclosure relates generally to SIM subscriptions and, more specifically, to updating and initializing SIM subscriptions remotely using a SIM Applet over the AIR.

BACKGROUND

Recently, Internet-of-Things (IoT) devices have become increasingly popular among tech manufacturers, as well as with consumers. IoT devices include physical devices and everyday objects that are configured to connect to a network, such as the Internet, allowing the devices to perform advanced functions using the network connectivity. IoT devices may include an array of appliances, ranging from refrigerators and microwaves to security cameras and thermostats. Many such devices are designed to be connected to home or work wireless internet networks, using a wireless router or access point to connect to the Internet. This setup is often convenient and cost-friendly, as many IoT devices are used within the range of a standard network.

However, many devices that can benefit from IoT connectivity are located beyond the range of routers or access points. One method of offering the same connectivity is to use cellular networks. For example, devices used in the field may employ a subscriber identity module (SIM) card to connect to a modern Global System for Mobile Communications (GSM), a Long-Term Evolution (LTE) network, and the like. A SIM card is a secure element integrated circuit board card that allows a network to identify the connected device in order to grant network access and authenticate subscribers. Using this model, when a subscriber wishes to switch from one service provider to another, a second SIM card should be obtained and swapped out for a first card, thus registering a device on a new network.

Recently, various standard groups have introduced a new evolution of SIM cards where a physical card is not required, but rather where the same SIM credentials are downloaded directly to a device stored therein. This is referred to as an eSIM or an iSIM. Here, no physical switch needs to take place to transfer from a first to a second network, but rather new software or profile information is downloaded onto a device to configure the device to connect to a new provider. This is referred to as SIM provisioning.

One challenge with manufacturing IoT devices for use with an eSIM or SIM card is that devices are often intended to be sold and used in various locations, where using a single SIM credential, or profile, is insufficient. Whether or not the SIM card is inserted, or the eSIM card credentials are downloaded, at the place of manufacturing, or by a later vendor, the ability to adapt to connect to multiple or shifting networks may be required for optimal coverage. Additionally, having to manually swap SIM cards or even connect to a network to download eSIM credentials can be inefficient and potentially difficult when used in remote and hard to reach locations. For example, if a weather station, configured to be connected via an eSIM, is manufactured for one SIM-compatible region and is installed in a second region in a remote part of a forest, it could take time, money, and manpower to update or change SIM credentials, or any settings or profiles connected thereto, if physical access to the device is required.

Another challenge in the manufacture of IoT devices is that the manufacturer may have no knowledge of where the IoT devices will be eventually deployed, as the activation of a device is typically at a later time of the manufacturing. As such, provisioning of each device with a per-allocated active SIM maybe costly inefficient.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for initializing an electronic subscriber identity module (SIM). The method comprises selecting a first bootstrap profile out of a plurality of bootstrap profiles configured with a device, wherein the first bootstrap profile is set with a first range of international mobile subscriber identifiers (IMSIs); activating the first bootstrap profile; attempting to connect to a first cellular network through an IMSI in the range of IMSIs; and establishing a connection with a central server when the device is connected to the first cellular network.

In addition, certain embodiments disclosed herein include a device configured with a plurality of bootstrap profiles for activating an eSIM installed therein. The device includes a processing circuitry; and a memory, the memory containing instructions that, when executed by the processing circuitry, configure the device to: select a first bootstrap profile out of a plurality of bootstrap profiles configured with a device, wherein the first bootstrap profile is set with a first range of international mobile subscriber identifiers (IMSIs); activate the first bootstrap profile; attempt to connect to a first cellular network through an IMSI in the range of IMSIs; and establish a connection with a central server when the device is connected to the first cellular network.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1:
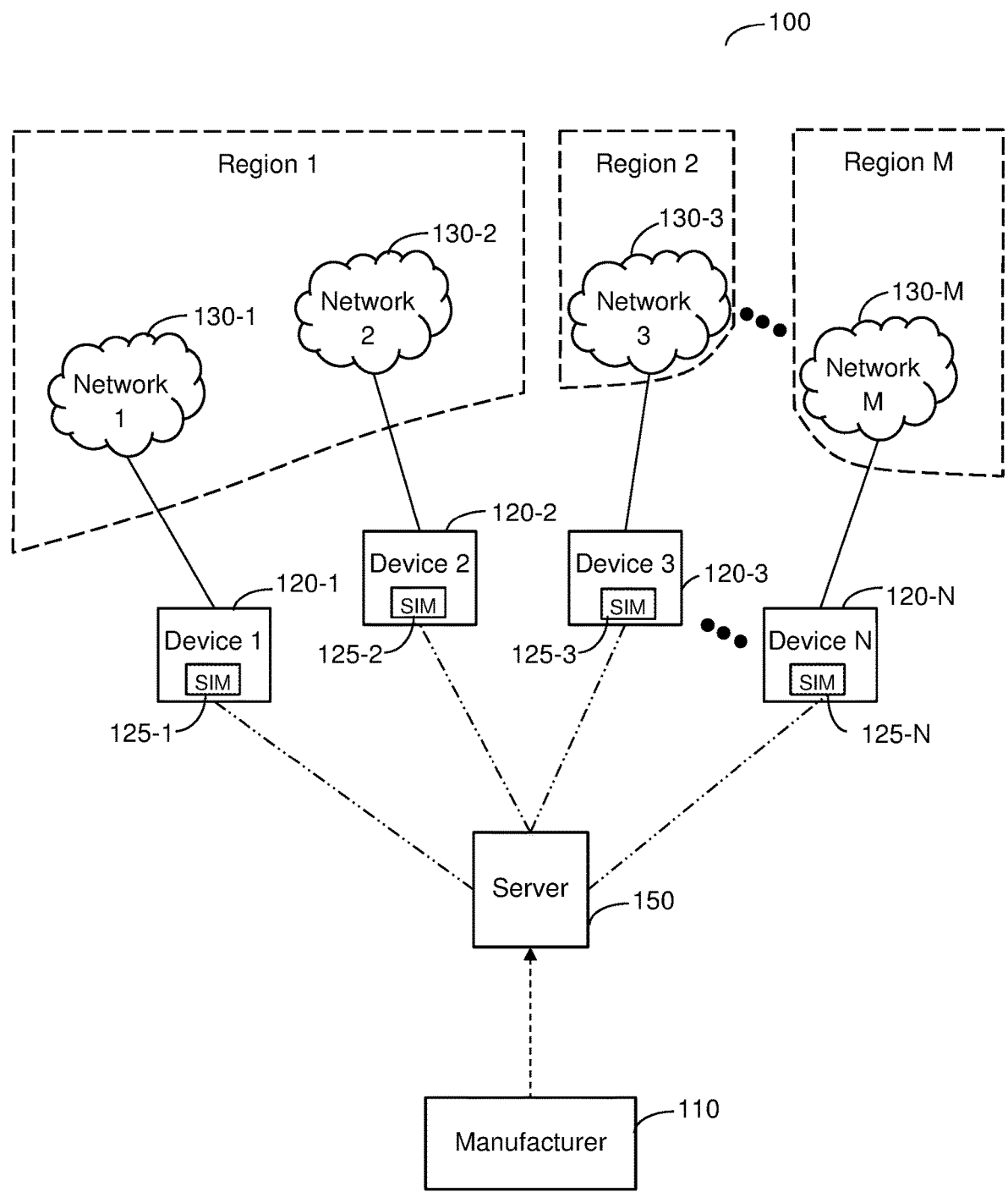
FIG. 1 is a block diagram showing an example distribution model of multi-international mobile subscriber identifier (IMSI) SIM devices.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to some example embodiments, SIM initialization, including IMSI selection and timer expiration processes are disclosed. In an embodiment, eSIM initialization includes remote SIM provisioning, which allows consumers as well as data providers to remotely activate an eSIM or SIM card in a device to update various profile and location data. This initialization is crucial for devices that are manufactured to be deployed in various regions where the profiles must be updated to configure a device to connect to a local provider's network.

In some embodiments, a device without a profile loaded and enabled may use a number of alternative methods to download a profile. These include using a special purpose 'Provisioning Profile,' also referred to as a bootstrap or fallback, to connect to a cellular network for both consumer and machine-to-machine (M2M) solutions, or using a non-cellular network, such as a Wi-Fi network, or a primary device with its own cellular connection, such as a mobile hotspot from a second device. Once this local connection is established, the SIM initialization may continue, and an updated profile for local use can be installed and configured.

FIG. 1 is an example block diagram showing an example distribution model 100 of multi-IMSI SIM devices. In many cases, a single manufacturer 110 designs and produces many devices 120-1 to 120-n requiring an eSIM, where 'n' is an integer equal to or greater than 1, for use in multiple end destinations. These destinations have cellular networks 130-1 to 130-m, where 'm' is an integer equal to or greater than 1, that will be used to provide connectivity to the devices 120. The cellular networks 130 may include LTE networks, GSM networks, 3G networks, 5G networks, and the like.

In one embodiment, the manufacturer 110 produces devices 120 to be used in multiple destinations, where the destinations include more than one network region. Network regions are regions that use a particular set of network parameters to connect devices to local networks. Regions differ throughout the world, and a device 120 configured to operate within one region will often not be compatible to communicate on networks within another region. Further, it may not be practical or feasible to preprogram each and every device 120 with the exact parameters needed to connect and work with every potential network, as the manufacturer 110 may not know a device's destination. Further, a manufacturer 110 may not control where the device is finally located, as the device may be resold or moved from an intended destination to an unintended one.

For example, Devices 1 and 2, 120-1 and 120-2 respectively, may be destined for use with networks 130-1 and 130-2 that are both located within region 1. In an embodiment, region 1 is a common end destination for devices manufactured by the manufacturer 110 and, therefore, each of those devices may be configured with SIM parameters, 125-1 and 125-2 respectively, that allow connectivity within region 1. However, region 2 may be an uncommon region for devices 120 made by the manufacturer 110 and, thus, parameters for using a device, such as Device 3 120-3, within region 2 are not stored within the Device 3 120-3.

According to an embodiment, all devices 120 manufactured by the manufacturer 110 include one profile configured within the eSIM of each device 120. Such a profile defines network parameters to communicate through global roaming, so as to allow connection to a central server 150 from any region. If a device, such as Device 3 120-3, is located within a region and lacks a profile for communication with networks within that region, the device is configured to connect to the central server 150, to download all the relevant profiles, and to reconfigure its settings for connection to the local network. The connection between a device 120 and the central server 150 is over an unstructured supplementary service data (USSD) channel, cellular Data channel, or using SMS messages.

By way of example, and without limitation, if a manufacturer 110 mainly exports devices 120 to China and the U.S.A., all of its manufactured devices 120-1 through 120-N may be programmed with eSIM profiles that include network parameters for connecting to networks 130 within those regions. Upon initialization within that region, such as Region 1, the device 120 is ready to function normally. However, if a device, such as Device 3 120-3, ends up in a region that is a less common end destination, such as Italy, the Device 120-3 would lack the proper network parameters to connect with an Italian cellular network, such as Network 3.

In the same example, to remedy such lack of proper network parameters, according to an embodiment, the Device 3 120-3 first creates a temporary connection to the central server 150, downloads a local eSIM profile including network parameters for connecting to an Italian Network 3 130-3, and activates the local eSIM profile on the Device 3 120-3, thereby allowing for a permanent and reliable connection going forward. In an embodiment, the initial temporary connection and relaying of network parameters may be executed over USSD, cellular Data channel, or SMS messaging protocols.

In another embodiment, a profile can be configured with a multi-range bootstrap IMSI. A multi-range bootstrap IMSI (or a fallback IMSI) is a mechanism that allows a large number of devices to be manufactured with one identical configuration of eSIM (or SIM). That is, the same identical eSIM may have the same SIM profile settings and the same set of bootstrap IMSI ranges. A bootstrap IMSI range is defined as a range of IMSIs, such as a number, 'N,' of consecutive IMSIs, where N is an integer number. The same range can used by a different number, 'M,' of IoT devices, where M is an integer number. It should be noted that M is a greater number than N. For example, one million devices may use a similar SIM setting, and each SIM can hold a single range of 1000 bootstrap IMSIs. Again, an IMSI is a unique number, usually fifteen digits, associated with Global System for Mobile Communications (GSM) and Universal Mobile Telecommunications System (UMTS) network mobile phone users. The IMSI is a unique number identifying a GSM subscriber.

According to an embodiment, each time an IoT device is required to use a bootstrap IMSI, the applet is configured to allocate a single bootstrap IMSI out of the existing range in order to allow the device to connect to the cellular network. In an embodiment, the eSIM applet is further configured to handle the best-optimized IMSI allocation out of the predefined range. Statistically, an IoT device would require activating a profile with a bootstrap IMSI for a very short time period, only allowing the device a first connection to the server 150.

In an embodiment, when a plurality of IoT devices attempt to connect to the network 130 with the same allocated bootstrap IMSI, the server 150 is configured to allow only a first IoT device to register, where all other IoT devices would be rejected from registration to a network 130. That is, one IoT device assigned with an bootstrap IMSI can be connected to the cellular network, while other devices with the same bootstrap IMSI shall not be able to register with the same allocated bootstrap IMSI.

In an embodiment, multiple profiles can be defined, each of which may be configured with a bootstrap IMSI allocating connectivity through a separate carrier. In this embodiment, when a device is not able to connect to a network 130 with a first allocated bootstrap IMSI, the SIM applet is configured to initiate a connection through a second profile of bootstrap IMSI. In this embodiment, the SIM applet can support more than one bootstrap IMSI profiles for the purpose of redundancy. That is, each bootstrap IMSI profile may be set with an IMSI range. For example, a Profile 1 may be defined as an IMSI-X with range of Y and a Profile 2 may be defined as an IMSI-M with range of X (where Y is different than X). The SIM applet settings configuration may define the eSIM logic of which mechanism to use when a bootstrap IMSI fails to register to a network.

In a further embodiment, an IoT device 120 may retain a first SIM profile identifier for initial connection and location reporting purposes, and may use a second SIM profile identifier for data connectivity over the network 130 of the local region. For example, each device may be equipped with a global ID, such as an IMSI number, used to identify the device with a unique worldwide identifier. However, a second identifier may be required to properly connect to a local network. Thus, a single device 120 may be configured to simultaneously connect to a central server as well as to a local network, using multiple eSIM interfaces, each with unique network parameters.

In an embodiment, the eSIM profile includes executable code, such as, but not limited to, a Java® applet.

Figure 2:
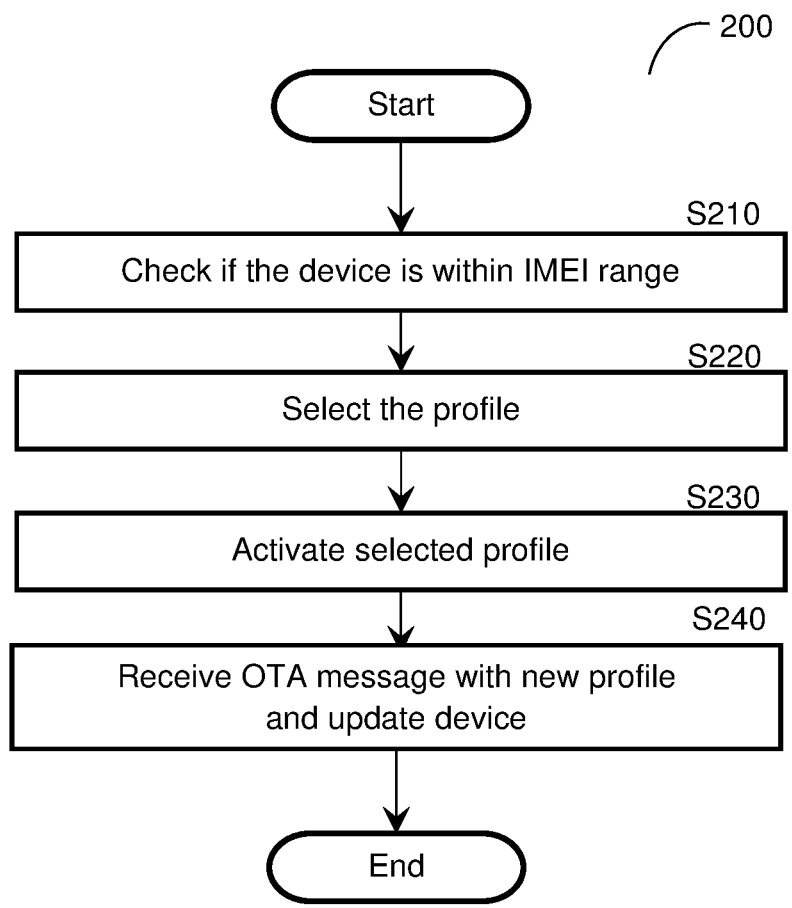
FIG. 2 is a flowchart illustrating a method of eSIM initialization according to an embodiment.

FIG. 2 is an example flowchart 200 illustrating a method of eSIM initialization according to an embodiment. The eSIM initialization begins when a device, such as an internet of thing (IoT) device or a mobile phone, is booted up, or powered on. This may be a single time event, or may occur on a frequent basis, for example if the IOT device is configured to reboot at regular intervals or at a predetermined time.

At S210, it is checked if the international mobile equipment identity (IMEI) number of the device is part of a range of IMEI numbers. When the IMEI number is not part of such range, the device is blocked and an error message is sent. Typically, the device is authorized and its IMEI number is part of such range and, thus, execution continues with S230.

At S220, a profile is auto-selected by the device. The profile includes a number of IMSIs that would allow optimized operation of the device with one or more operators.

In an embodiment, the selected profile is a default, or fallback or bootstrap, profile. This type of profile includes a range of IMSIs to be mathematically selected. Activation of the default profile is temporary and is used in order to receive instructions from the server on a profile that should be selected and activated. The temporary utilization of bootstrap profiles allows reusing the IMSIs across very large number of SIMs/eSIMs.

At S230, the selected profile is activated. This allows connecting the device to a local network based on the selected profile. The selected profile includes parameters allowing connection between the device and at least one local network, such as via a mobile wireless network tower. In an embodiment, the IMSI used is based on the selected profile from a list stored in a SIM profile of the device, where the IMSI may be assigned priority and where the matching is done according to a specific order, such starting from the highest numbered profile (10) to the lowest (1).

In an embodiment, once a connection to the local network has been established, a new profile may be selected by the server. The selection is based on the location of the device, as well as other relevant factors, such as availability of local networks. The new profile is a permanent profile that will be used to establish a stable connection to a local network. In an embodiment, as discussed in FIG. 2, S230 may include allocating and activating a bootstrap IMSI out of the multi-range bootstrap IMSIs.

At S240, an over the air (OTA) message is received that includes the new profile selected by the central server. The new profile is then loaded onto the device, and the device is updated with the relevant parameters contained therein, including a new permanent IMSI number. Thereafter, the connection is refreshed.

Figure 3:
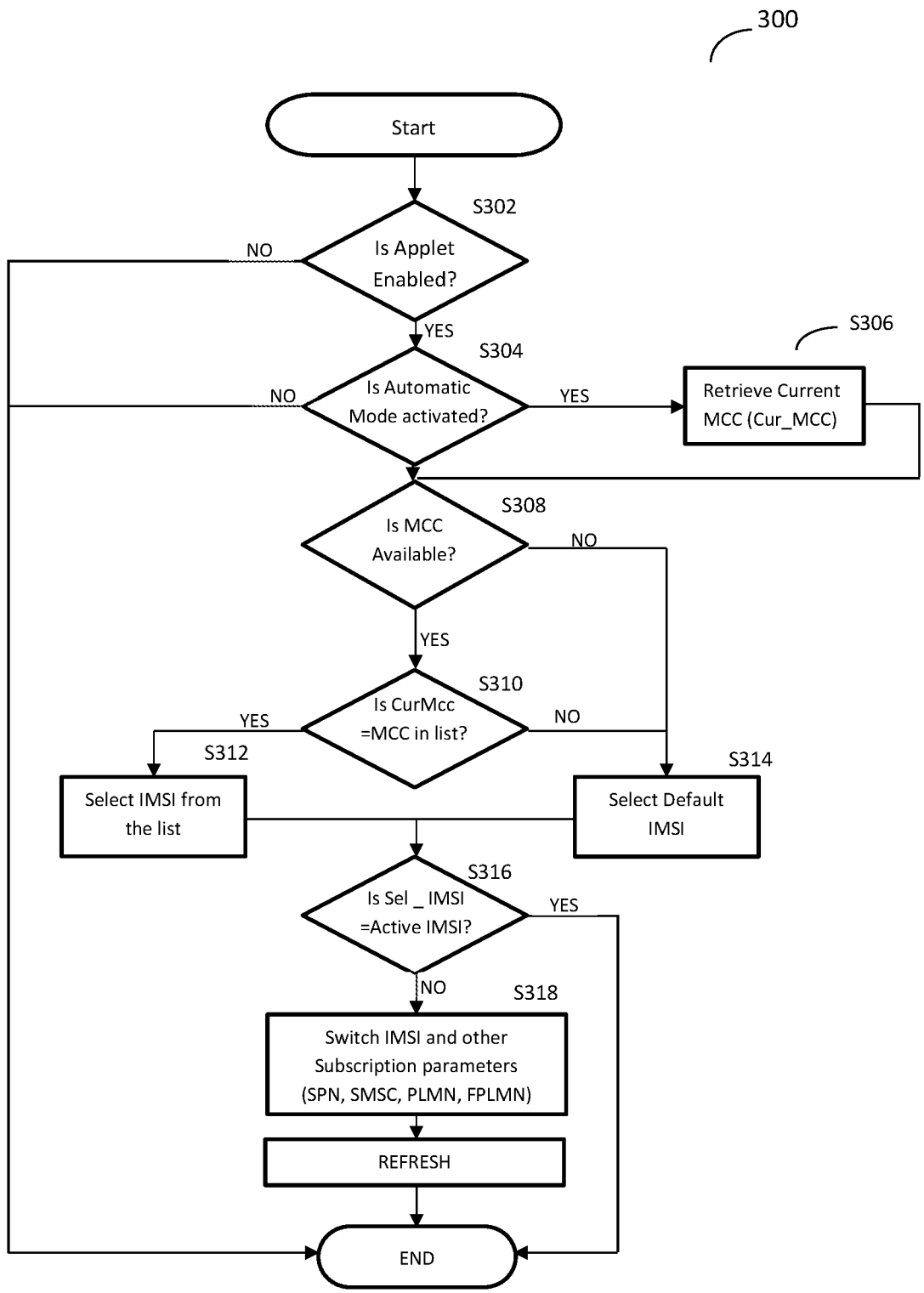
FIG. 3 is a flowchart illustrating a method of IMSI selection according to an embodiment.

FIG. 3 is an example flowchart illustrating a method 300 of IMSI selection according to an embodiment.

First, at S302, it is determined whether the SIM Applet is enabled on the device. If not, the SIM initialization cannot continue, and the process ends. If the Applet is enabled, it is determined whether automatic mode is enabled as well as S304. Again, if not, the process initialization cannot continue, and the process ends. If automatic mode is enabled, the current MCC is retrieved at S306.

At S308, it is determined if the MCC of the device is available. If not, a default IMSI is selected for the device at S314. If an MCC of the device is available, at S310 it is determined whether the current MCC is the same as the MCC of the device. If not, the default IMSI is selected at S314. If the current and device MCC do match, an IMSI is selected from a predetermined list at S312. If the selected IMSI is the same as an active IMSI of the device, determined at S316, no more steps are required, and the process ends. If the active and device IMSI do not match each other, a new IMSI is selected, at S318, along with additional subscription parameters, such as Service Provider Name, Short Message Service Center, Public Land Mobile Network, Forbidden Public Land Mobile Network, and the like. The device is then refreshed, and the IMSI selection process is complete.

Figure 4:
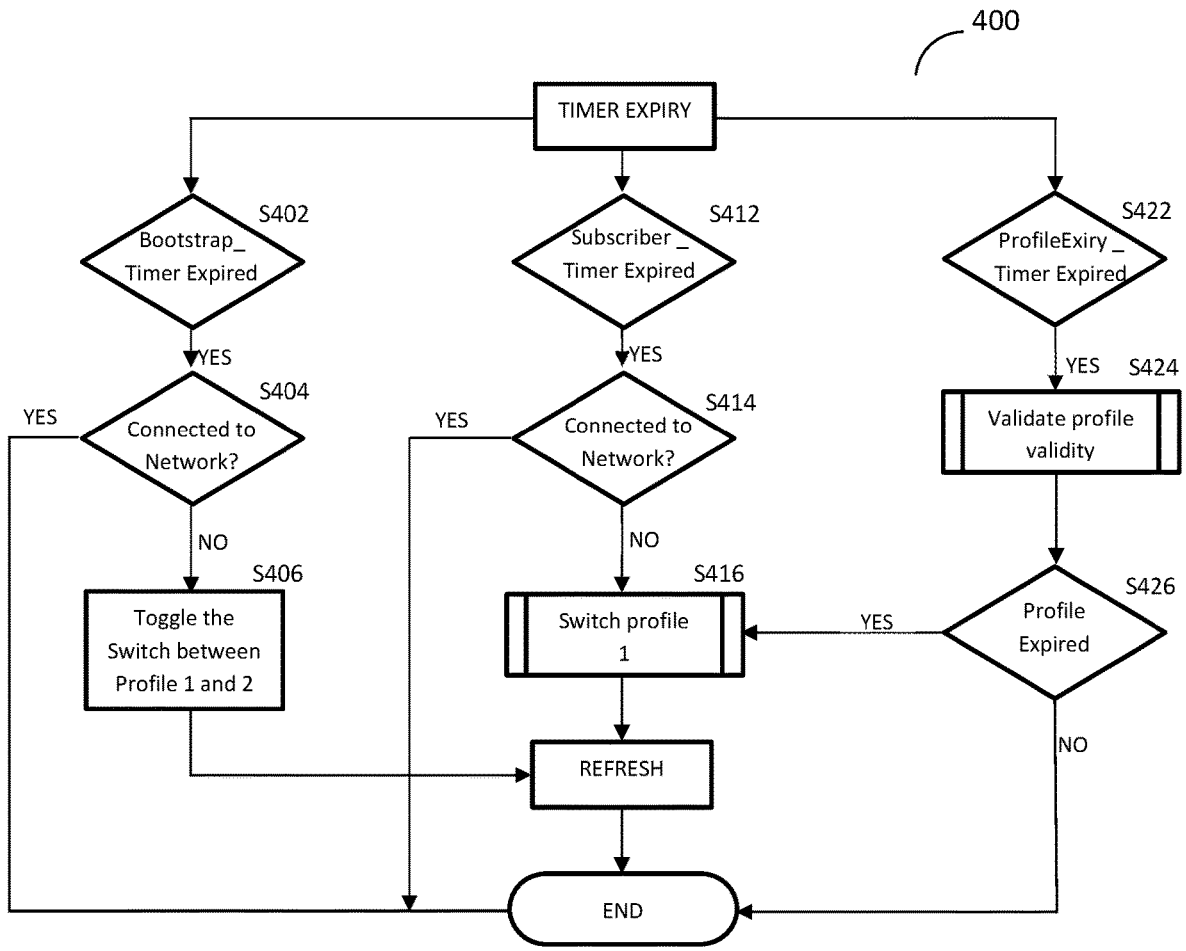
FIG. 4 is a flowchart illustrating a method of timer expiration according to an embodiment.

FIG. 4 is an example flowchart 400 illustrating a method of timer expiration according to an embodiment. It is determined whether timer expiration has occurred, where timer expiration includes bootstrap timer expiration at S402, subscriber timer expiration at S412, and profile timer expiration at S422.

If the bootstrap timer has expired, it is determined whether the device is connected to the network at S404. If so, the process ends. Otherwise, the activated profile is toggled between a first and a second profile at S406.

If the subscriber timer has expired, it is determined whether the device is connected to the network at S414. If so, the process ends. Otherwise, the device profile is switched to a first profile, the device is refreshed, and the process ends.

If the profile timer has expired, the profile validity is validated as S424. It is then determined whether the profile itself has expired at S426. If so, the device profile is switched to a first profile at S416, and the device refreshed. Otherwise, the process ends.

Figure 5:
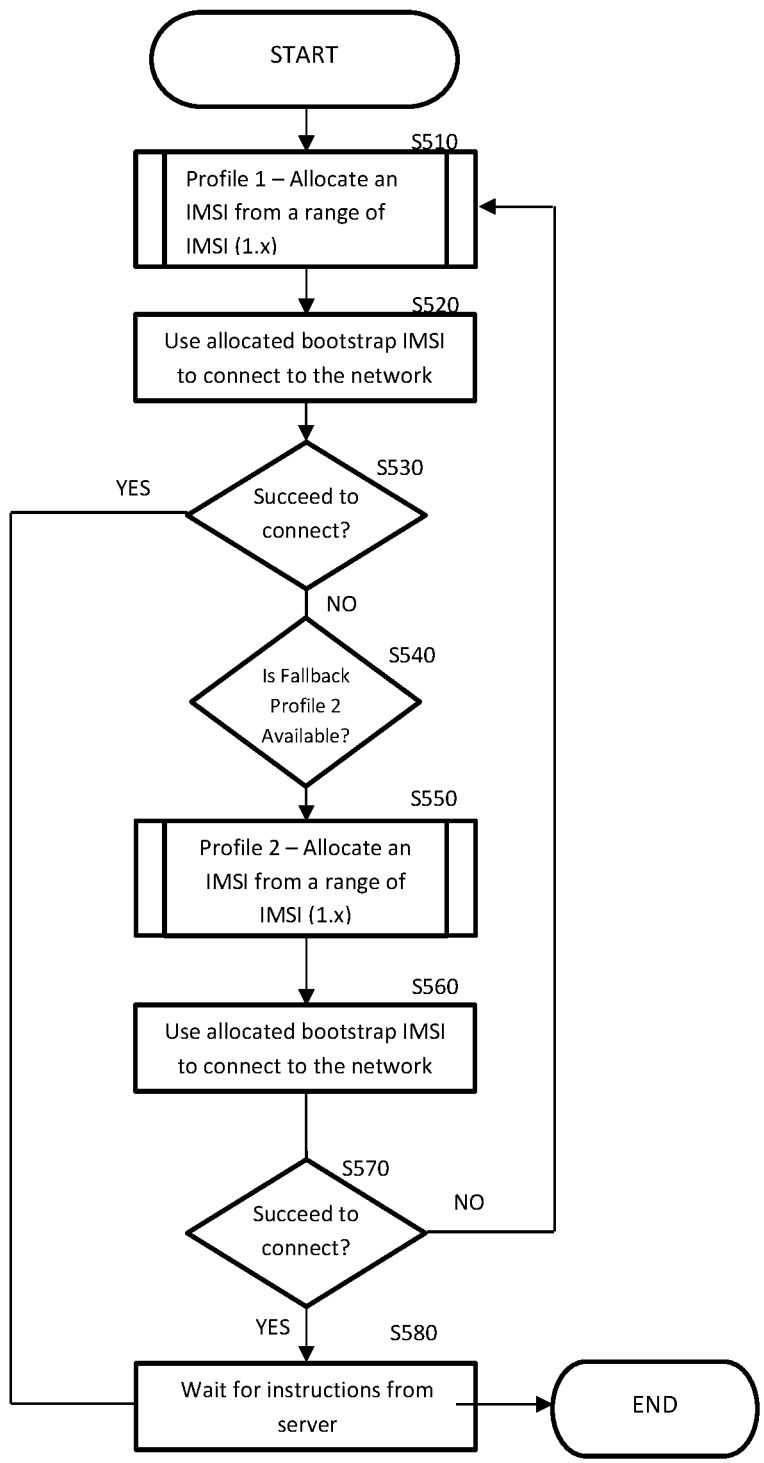
FIG. 5 is a flowchart illustrating a method of allocating a bootstrap IMSI according to an embodiment.

FIG. 5 is an example flowchart illustrating a method 500 for allocating a bootstrap IMSI according to an embodiment. The method allows for a device, such an IoT device, to be set with a plurality profiles, where each such profile is set as a multi-range bootstrap IMSI. A bootstrap IMSI allows for a large number of devices to be manufactured with one identical configuration of eSIM (or SIM).

At S510, a first bootstrap IMSI profile is activated. The first bootstrap profile is selected and IMSI number is allocated with a first range of IMSIs. The range can by any integer number, greater than one, of consecutive IMSIs. The first bootstrap IMSI profile is further set to allow connectivity to the cellular network.

At S520, an attempt is made to connect the device to the cellular network through the IMSI allocated from the first bootstrap IMSI profile. The attempt is made to allow connectivity through the allocated IMSI out of the range of IMSIs defined in the first profile.

At S530 it is checked if the device was successfully connected to the network and, if so, execution continues with S580; otherwise, execution continues with S540, where it is checked if a second bootstrap profile is available. If so, execution continues with S550; otherwise, execution continues to S580.

At S550, a second bootstrap IMSI profile is activated. The second bootstrap profile is selected and an IMSI is allocated with a second range of IMSIs. The second range can be any integer number, greater than one, of consecutive IMSIs. The second bootstrap IMSI profile is set to allow connectivity to the cellular network.

At S560, an attempt is made to connect the device to the cellular network through the IMSI allocated from the second bootstrap IMSI profile. The attempt is made to allow connectivity through the allocated IMSI out of range of IMSIs defined in the second profile.

At S570 it is checked if the device was successfully connected to the cellular network and, if so, execution continues with S580; otherwise, execution returns to S510. At S580, instructions are received from a central server, such as the central server 150, as to the operations to perform over the network.

It should be noted that a range of IMSIs defined in the bootstrap profiles may be allocated to different devices. It should be noted that the number of devices that can be manufactured with an identical range of bootstrap IMSIs is greater than the size of the IMSI range. In some configurations, the number of bootstrap profiles may be 1. Further, up to 10 bootstrap profiles can be set in a SIM. A device may be pre-configured with the bootstrap profiles, or such profiles may be configured on-the-fly. In the latter embodiment, the configuration may be performed using the central server over an unstructured supplementary service data (USSD) channel, cellular Data channel, or using SMS messages.

The disclosed embodiments have been discussed with reference to specific examples of a profile defined with one or more SIM. However, one of ordinary skill would recognize that the embodiments, disclosed herein, are also applicable when utilizing iSIMs, soft SIMs, eSIM, and the like, or SIM cards.

The embodiments disclosed herein can be performed by a SIM applet configured with the device. The device may be an IoT device, a mobile device, a smartphone or any device that allows connectivity over a cellular network. The SIM applet may be realized as computer-readable instructions such as software, firmware, or combination thereof executed by hardware circuitry. The circuitry may include a processor or a controller and a memory. The memory may be volatile, non-volatile, or a combination thereof. In one configuration, computer-readable instructions to implement one or more embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for initializing a single electronic subscriber identity module (eSIM) installed in an Internet-of-Things (loT) device, comprising:

selecting, by the IoT device, a first bootstrap profile out of a plurality of bootstrap profiles configured on the single eSIM;
allocating, by the IoT device, at least one first international mobile subscriber identity (IMSI) from a range of IMSIs to the first bootstrap profile, wherein allocating the at least one first IMSI further includes selecting the at least one first IMSI from the first bootstrap profile when a current mobile country code (MCC) is different from a MCC set for the set IoT device;
activating, by the IoT device, the first bootstrap profile;
attempting, by the IoT device, to connect to a first cellular network through the allocated at least one first IMSI;
responsive to inability to connected to the cellular network,
    selecting, by the IoT device, a second bootstrap profile, out of the plurality of bootstrap profiles, to connect to the cellular network through an allocated at least one second IMSI;
    activating, by the IoT device, the second bootstrap profile; and
    attempting to connect to the cellular network through the allocated at least one second IMSI from a range of IMSIs to the second bootstrap profile;
upon successful connection to the cellular network through either the first IMSI or the second IMSI;
    receiving an over-the-air (OTA) message, the OTA message includes a new profile selected by a central server;
    loading the new profile onto the IoT device; and
    updating the IoT device with a new permanent IMSI; and
establishing a connection with the central server based on the permanent IMSI when the IoT device is connected to the cellular network.

2. The method of claim 1, wherein the second cellular network is different than the first cellular network.

3. The method of claim 2, wherein each of the first cellular network and the second cellular network is any of: a global system for mobile communications (GSM) network, a long-term evolution (LTE) network, a 3G network, and a 5G network.

4. The method of claim 2, wherein a number of IMSIs allocated to the first bootstrap profile is different from a number of IMSIs allocated to the second bootstrap profile.

5. The method of claim 4, wherein the number of IMSIs is an integer number greater than 1.

6. The method of claim 1, further comprising:
checking if an international mobile equipment identity (IMEI) number of the IoT device is part of a range of IMEI numbers; and
sending an error message when the IMEI number of the IoT device is not part of the range of IMEI numbers.

7. The method of claim 1, wherein each selected profile out of the plurality of profiles includes parameters allowing connection between the IoT device and a respective cellular network.

8. The method of claim 1, wherein the new permanent IMSI number is selected based on at least optimal cost and network connectivity.

9. A non-transitory computer readable medium having stored thereon instructions for causing a processing circuitry to execute a process, the process comprising:
selecting, by the IoT device, a first bootstrap profile out of a plurality of bootstrap profiles configured with the IoT device, wherein the plurality of bootstrap profiles are configured on the single eSIM;
allocating, by the IoT device, at least one first international mobile subscriber identity (IMSI) from a range of IMSIs to the first bootstrap profile, wherein allocating the at least one first IMSI further includes selecting the at least one first IMSI from the first bootstrap profile when a current mobile country code (MCC) is different from a MCC set for the set IoT device;
activating, by the IoT device, the first bootstrap profile;
attempting, by the IoT device, to connect to a first cellular network through the allocated at least one first IMSI;
responsive to inability to connect to the cellular network,
    selecting, by the IoT device, a second bootstrap profile, out of the plurality of bootstrap profiles, to connect to the cellular network through an allocated at least one second IMSI;
    activating, by the IoT device, the second bootstrap profile; and
    attempting to connect to the cellular network through the allocated at least one second IMSI from a range of IMSIs to the second bootstrap profile;
upon successful connection to the cellular network through either the first IMSI or second IMSI:
    receiving an over-the-air (OTA) message, the OTA message includes a new profile selected by a central server;
    loading the new profile onto the IoT device; and
    updating the IoT device with a new permanent IMSI; and
establishing a connection with the central server based on the at bast one first IMSI Of the permanent IMSI when the IoT device is connected to the cellular network.

10. An IoT device configured with a plurality of bootstrap profiles for activating an eSIM installed therein, comprising:
a processing circuitry; and
a memory, the memory containing instructions that, when executed by the processing circuitry, configure the device to:
    select, by the IoT device, a first bootstrap profile out of a plurality of bootstrap profiles configured with the IoT device, wherein the plurality of bootstrap profiles are configured on the single eSIM;
    allocate, by the IoT device, at least one first international mobile subscriber identity (IMSI) from a range of IMSIs to the first bootstrap profile, wherein allocating the at least one first IMSI further includes selecting the at least one first IMSI from the first bootstrap profile when a current mobile country code (MCC) is different from a MCC set for the set IoT device;
    activate, by the IoT device, the first bootstrap profile;
    attempt, by the IoT device, to connect to a first cellular network through the allocated at least one first IMSI; and
    responsive to inability to connected to the cellular network,
        select, by the IoT device, a second bootstrap profile, out of the plurality of bootstrap profiles, to connect to the cellular network through an allocated at least one second IMSI;
        activate, by the IoT device, the second bootstrap profile; and
        attempt to connect to the cellular network through the allocated at least one second IMSI from a range of IMSIs to the second bootstrap profile;
    upon successful connection to the cellular network through either the first IMSI or second IMSI:
        receive an over-the-air (OTA) message, the OTA message includes a new profile selected by a central server;

load the new profile onto the IoT device; and
update the IoT device with a new permanent IMSI; and
establishing a connection with the central server based on the permanent IMSI when the IoT device is connected to the cellular network.

11. The device of claim 10, wherein the second cellular network is different than the first cellular network.

12. The device of claim 10, wherein each of the first cellular network and the second cellular network is any of: a global system for mobile communications (GSM) network, a long-term evolution (LTE) network, a 3G network, and a 5G network.

13. The device of claim 10, wherein a number of IMSIs allocated to the first bootstrap profile is different from a number of IMSIs allocated to the second bootstrap profile.

14. The device of claim 10, wherein the number of IMSIs is an integer number greater than 1.

15. The device of claim 10, wherein the device is further configured to:
check if an international mobile equipment identity (IMEI) number of the IoT device is part of a range of IMEI numbers; and
send an error message when the IMEI number of the IoT device is not part of the range of IMEI numbers.

16. The device of claim 10, wherein each selected profile out of the plurality of profiles includes parameters allowing connection between the device and a respective cellular network.

17. The device of claim 10, wherein the new permanent IMSI number is selected based on at least optimal cost and network connectivity.

* * * * *